United States Patent
Chen et al.

(10) Patent No.: US 12,086,510 B2
(45) Date of Patent: Sep. 10, 2024

(54) INDOOR DESIGN SCHEME ACQUISITION METHOD AND APPARATUS, COMPUTER DEVICE AND STORAGE MEDIUM

(71) Applicant: SHENZHEN XUMI YUNTU SPACE TECHNOLOGY CO., LTD., Shenzhen (CN)

(72) Inventors: Fan Chen, Shenzhen (CN); Zheng Zhou, Shenzhen (CN); Rui Li, Shenzhen (CN); Ruizhi Xu, Shenzhen (CN)

(73) Assignee: SHENZHEN XUMI YUNTU SPACE TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/689,871

(22) PCT Filed: Mar. 29, 2022

(86) PCT No.: PCT/CN2022/083569
§ 371 (c)(1),
(2) Date: Mar. 7, 2024

(87) PCT Pub. No.: WO2023/035592
PCT Pub. Date: Mar. 16, 2023

(65) Prior Publication Data
US 2024/0273252 A1 Aug. 15, 2024

(30) Foreign Application Priority Data
Sep. 9, 2021 (CN) .......................... 202111053062.5

(51) Int. Cl.
*G06F 30/13* (2020.01)

(52) U.S. Cl.
CPC .................................. *G06F 30/13* (2020.01)

(58) Field of Classification Search
CPC ....................................................... G06F 30/13
(Continued)

(56) References Cited

U.S. PATENT DOCUMENTS 11,087,054 B2 * 8/2021 Austern ................. G06F 30/18
2019/0041972 A1 * 2/2019 Bae ......................... G06F 3/011

FOREIGN PATENT DOCUMENTS

| CN | 107240151 A | 10/2017 |
|---|---|---|
| CN | 108694266 A | 10/2018 |

(Continued)

*Primary Examiner* — Andre Pierre Louis
(74) *Attorney, Agent, or Firm* — Bayramoglu Law Offices LLC (57) ABSTRACT

An indoor design scheme acquisition method and apparatus, a computer device and a storage medium are provided. The method includes: acquiring basic information of a target room, the basic information at least including house structure information; controlling a layout of articles in the target room based on the basic information of the target room to generate at least one design scheme of the target room, the design scheme including the house structure information and article placement information; acquiring scores of the design schemes based on the house structure information and the article placement information; and determining the design scheme meeting a preset requirement as a target design scheme based on the scores of the design schemes. The method can adapt to design requirements of different scenarios and different house structures, and the design scheme meeting a preset requirement is determined by scoring all the design schemes.

10 Claims, 6 Drawing Sheets

(58) Field of Classification Search
USPC .............................................................. 703/1
See application file for complete search history.

(56) References Cited

FOREIGN PATENT DOCUMENTS

| | | | |
|---|---|---|---|
| CN | 109408954 | A | 3/2019 |
| CN | 109509057 | A | 3/2019 |
| CN | 111028333 | A | 4/2020 |
| CN | 111105473 | A | 5/2020 |
| CN | 111709061 | A | 9/2020 |
| CN | 111709062 | A | 9/2020 |
| CN | 111709069 | A | 9/2020 |
| CN | 111986305 | A | 11/2020 |
| CN | 112131645 | A | 12/2020 |
| CN | 113505429 | A | 10/2021 |

* cited by examiner

INDOOR DESIGN SCHEME ACQUISITION METHOD AND APPARATUS, COMPUTER DEVICE AND STORAGE MEDIUM

CROSS REFERENCE TO THE RELATED APPLICATIONS

This application is the national phase entry of International Application No. PCT/CN2022/083569, filed on Mar. 29, 2022, which is based upon and claims priority to Chinese Patent Application No. 202111053062.5, filed on Sep. 9, 2021, the entire contents of which are incorporated herein by reference.

TECHNICAL FIELD

The present disclosure relates to the field of indoor design technologies, and in particular, to an indoor design scheme acquisition method and apparatus, a computer device and a storage medium.

BACKGROUND

Indoor design means that an indoor layout scheme which has reasonable functions and is comfortable, attractive and capable of meeting living demands of users is obtained based on physical and technical means and indoor design requirements according to using properties, indoor environments and corresponding standards of buildings. A traditional indoor design process includes the stages of design preparation, scheme construction, construction drawing design, design implementation, or the like, a design period is long, the design process is complex, and a design effect is limited. Therefore, in order to overcome the shortcomings of traditional indoor design schemes, the computer technology for indoor design is increasingly favored by the market.

In the existing indoor scheme design process, the indoor scheme is usually automatically designed based on indoor design software, but there exists the situation that the design scheme does not meet a decoration specification and has low accuracy, and a satisfactory indoor design scheme is difficult to obtain.

SUMMARY

In view of this, embodiments of the present disclosure provide an indoor design scheme acquisition method and apparatus, a computer device and a storage medium, so as to solve the problem that a design scheme acquired in the prior art does not meet a decoration specification and has low accuracy.

In a first aspect of the embodiments of the present disclosure, there is provided an indoor design scheme acquisition method, including:
  acquiring basic information of a target room, the basic information at least including house structure information;
  controlling a layout of articles in the target room based on the basic information of the target room to generate at least one design scheme of the target room, the design scheme including the house structure information and article placement information;
  acquiring scores of the design schemes based on the house structure information and the article placement information; and
  determining the design scheme meeting a preset requirement as a target design scheme based on the scores of the design schemes.

In a second aspect of the embodiments of the present disclosure, there is provided an indoor design scheme acquisition apparatus, including:
  a basic information acquisition module configured to acquire basic information of a target room, the basic information at least including house structure information;
  a layout module configured to control a layout of articles in the target room based on the basic information of the target room to generate at least one design scheme of the target room, the design scheme including the house structure information and article placement information;
  a score acquisition module configured to acquire scores of the design schemes based on the house structure information and the article placement information; and
  a target scheme determining module configured to determine the design scheme meeting a preset requirement as a target design scheme based on the scores of the design schemes.

In a third aspect of the embodiments of the present disclosure, there is provided a computer device, including a memory, a processor and a computer program stored in the memory and runnable on the processor, wherein the processor, when executing the computer program, implements the steps of the above method.

In a fourth aspect of the embodiments of the present disclosure, there is provided a computer-readable storage medium storing a computer program, wherein the computer program, when executed by a processor, implements the steps of the above method.

Compared with the prior art, the embodiments of the present disclosure have the following beneficial effects: on the one hand, when the indoor articles are laid out, all the articles in the target room are controlled to move based on the house structure information of the target room, all the layout schemes of the indoor articles can be obtained, design requirements of different scenarios and different house structures can be met, and missing of the design schemes is avoided. On the other hand, in the embodiments of the present disclosure, the design scheme meeting the preset requirement is determined from all the technical schemes by scoring all the acquired design schemes, so as to guarantee correctness of the obtained target design scheme, avoid the situation that indoor design is incorrect, ensure that requirements of the decoration specification are met, effectively improve the accuracy of the design scheme, and quickly and conveniently obtain the indoor design scheme satisfied by a user.

BRIEF DESCRIPTION OF THE DRAWINGS

In order to more clearly illustrate the technical solutions in the embodiments of the present disclosure, the accompanying drawings used in the description of the embodiments or the prior art will be briefly introduced below. It is apparent that, the accompanying drawings in the following description are only some embodiments of the present disclosure, and other drawings can be obtained by those of ordinary skill in the art from the provided drawings without creative efforts.

DETAILED DESCRIPTION OF THE EMBODIMENTS

In the following description, for the purpose of illustration instead of limitation, specific details such as a particular system structure and a technology are provided to make the embodiments of the present disclosure understood thoroughly. However, it should be understood by those skilled in the art that the present disclosure can also be implemented in other embodiments without the specific details. In other cases, detailed description of well-known systems, apparatuses, circuits and methods is omitted, so that the present disclosure is described without being impeded by unnecessary details.

During indoor design, positions of indoor articles required to be subjected to indoor design are usually adjusted to obtain an indoor design scheme. Two schemes are mainly adopted during indoor design:

In one scheme, a machine learning model is trained using big data, and in this scheme, a large amount of data is required to be acquired and labeled, and then, the machine learning model is trained using the labeled data to obtain a machine learning model for automatic layout design. However, the method has extremely high requirements for richness and accuracy of the data, such that data acquisition difficulty is high; the data is usually labeled manually, which consumes a lot of manpower, resulting in a high data acquisition cost; the machine learning model obtained by training has no error correction capability, an error rate is high during indoor design, and the obtained design scheme does not meet the decoration specification.

In the other scheme, the indoor design scheme is generated based on a completely determined design rule, an adjustment cannot be performed according to an actual scenario, design errors are prone to occur, and diversity design requirements of different scenarios are difficult to meet.

When the indoor design is conducted using the two schemes, the errors prone to occur mainly include: furniture is placed too intensively, and a person passage cannot be reserved; the furniture blocks a door and a window; and the relationship between indoor article placement positions and civil engineering elements is incorrect, for example, a closestool is not provided near a sewage pipe, and the top of a kitchen range is far away from a flue position. Due to existence of the above errors, the obtained indoor design scheme has low accuracy, and the user cannot obtain a satisfactory indoor design scheme.

The present embodiment provides a brand new indoor design scheme acquisition method; when indoor articles are laid out, all layout schemes of the indoor articles can be automatically obtained based on house structure information of a target room, such that design requirements of different scenarios can be met, and missing of the design schemes is avoided; a design scheme meeting a preset requirement is determined from all the technical schemes by scoring all the acquired design schemes, so as to guarantee correctness of the obtained target design scheme, avoid the situation that indoor design is incorrect, improve the accuracy of the design scheme, meet requirements of the decoration specification, and quickly and conveniently obtain the indoor design scheme satisfied by the user.

An indoor design scheme acquisition method and apparatus according to embodiments of the present disclosure will be described in detail below with reference to the accompanying drawings.

Figure 1:
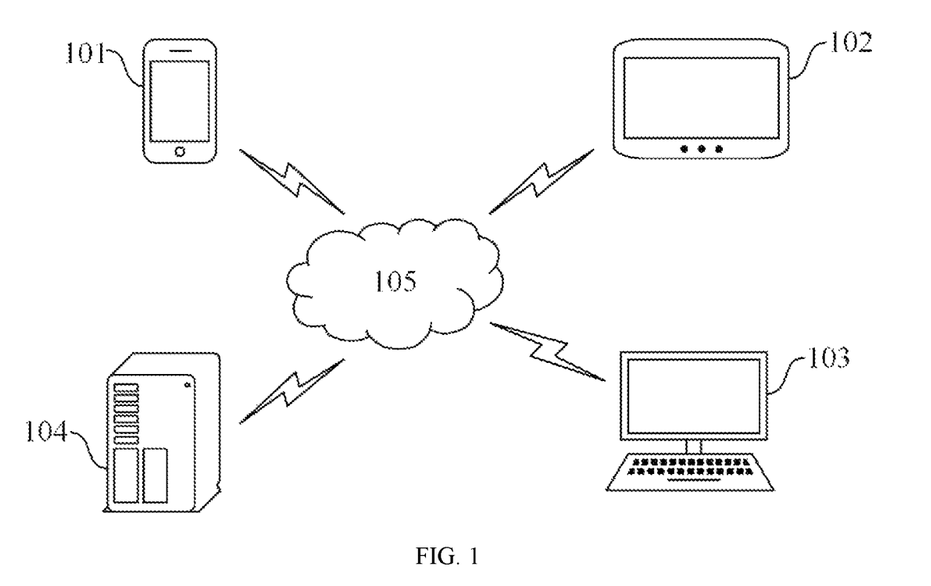
FIG. 1 is a schematic diagram of an application scenario of an embodiment of the present disclosure.

FIG. 1 is a schematic diagram of an application scenario of an embodiment of the present disclosure. The application scenario may include terminal devices 101, 102 and 103, a server 104 and a network 105.

The terminal devices 101, 102 and 103 may be hardware or software. When the terminal devices 101, 102 and 103 are hardware, the terminal devices may be various electronic devices having display screens and supporting communication with the server 104, including but not limited to smart phones, tablet computers, laptop portable computers, desktop computers, or the like, and the display screen of the terminal device may be a touch display screen or a non-touch display screen, and at this point, the terminal device is further provided with an interactive device, such as a mouse and a keyboard. When the terminal devices 101, 102 and 103 are software, the terminal devices can be installed in the electronic device as described above. The terminal devices 101, 102 and 103 may be implemented as a plurality of pieces of software or software modules, or may be implemented as a single piece of software or software module, which is not limited in the embodiment of the present disclosure. Further, various applications, such as an indoor design application, a data processing application, an instant messaging tool, social platform software, a search type application and a shopping type application, may be installed on the terminal devices 101, 102 and 103.

The server 104 may be a server providing various services, for example, a background server receiving a request sent by a terminal device establishing communication connection with the server, and the background server may receive and analyze the request sent by the terminal device, and generate a processing result. The server 104 may be a server, or a server cluster composed of a plurality of servers, or a cloud computing service center, which is not limited in the embodiment of the present disclosure. It should be noted that the server 104 may be hardware or software. When the server 104 is hardware, the server may be various electronic devices providing various services for the terminal devices 101, 102 and 103. When the server 104 is software, the server may be plural pieces of software or software modules providing various services for the terminal devices 101, 102 and 103, or may be a single piece of software or software module providing various services for the terminal devices 101, 102 and 103, which is not limited in the embodiment of the present disclosure.

The network 5 may be a wired network formed by connection using a coaxial cable, a twisted pair cable, and an optical fiber, or may be a wireless network which can interconnect various communication devices without wiring, for example, Bluetooth, Near Field Communication (NFC), Infrared, or the like, which is not limited in the embodiment of the present disclosure.

A user can establish communication connection with the server 104 through the network 105 by the terminal devices 101, 102 and 103 to receive or transmit information, or the like. Specifically, the terminal device is provided with an indoor design application, and in a running process of the indoor design application, an interface of the terminal device displays a page of the target room to be designed, and the target room can be designed by using a visualization engine, such as an unreal (UE) engine and a VRay engine, so as to realize page visualization.

The user inputs basic information of the target room, such as house structure information, by the terminal device, and the terminal device receives the basic information of the target room and then sends the basic information to the server 104. The server 104 controls a layout of articles in the target room based on the acquired basic information of the target room, and generates a design scheme of the target room according to article placement, the design scheme including the house structure information and article placement information. Further, the server 104 acquires a score of each design scheme based on the house structure information and the article placement information, selects the design scheme meeting a preset requirement from the design schemes as a target design scheme based on the score of each design scheme, and displays the target design scheme by the terminal device, such that the user can view the optimal design scheme for the target room.

It should be noted that specific types, numbers, and combinations of the terminal devices 101, 102 and 103, the server 104 and the network 105 may be adjusted according to actual needs of the application scenario, which is not limited in the embodiment of the present disclosure.

In other embodiments, the indoor design scheme acquisition method according to the present embodiment may also be implemented only by the terminal device, and at this point, the terminal device is provided therein with plural pieces of software or software modules providing various services, or may be a single piece of software or software module providing various services, which is not limited here.

Figure 2:
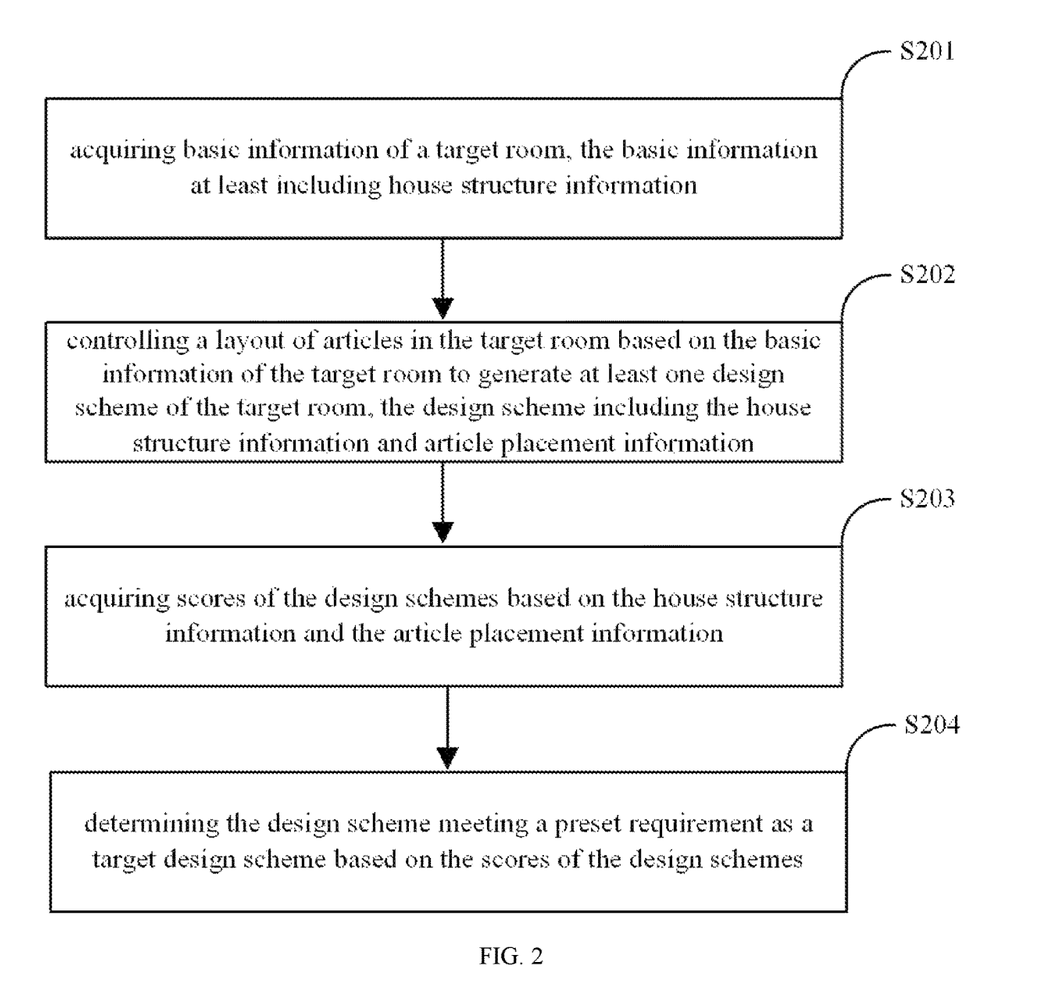
FIG. 2 is a flowchart of an indoor design scheme acquisition method according to the embodiment of the present disclosure.

FIG. 2 is a flowchart of an indoor design scheme acquisition method according to the embodiment of the present disclosure. The indoor design scheme acquisition method of FIG. 2 may be performed by the terminal device or the server of FIG. 1. As shown in FIG. 2, the indoor design scheme acquisition method includes:

S201: acquiring basic information of a target room, the basic information at least including house structure information.

During indoor layout design, an indoor model to be subjected to layout design is displayed by the terminal device, and the indoor model can be a two-dimensional model or a three-dimensional model. Taking a house as an example, the house usually includes a plurality of rooms, each room is provided therein with a plurality of articles, and the articles may be furniture (such as a bed, a bedside table, a wardrobe, a television bench and a sofa), home appliances (such as a television, a refrigerator and a washing machine), other household articles (such as a closestool and a wash basin), or the like. During the indoor layout design, all the rooms can be designed one by one, the selected room is the target room, and the target room is displayed on a display screen of the terminal device. Certainly, during the indoor design, only one of the rooms may be designed, and the room is the target room.

When the user requires the layout design of the target room, the basic information of the target room can be input into the terminal device, and an input mode can be set as required.

For example, the description is given with the basic information including the house structure information and the terminal device being a touch display device. For example, when the terminal device does not display the target room, the terminal device may display prompt words, the user clicks a button or any position of the display screen, the terminal device displays options of content required to be uploaded, and after the user selects the target room, the terminal device displays the target room and meanwhile acquires the house structure information associated with the target room. For another example, a button "input room information" is displayed on the interface of the terminal device, and after the user clicks the button, the terminal device displays options of content required to be uploaded, and after the user selects the target room, the terminal device displays the target room and meanwhile acquires the house structure information associated with the target room. For another example, the terminal device is provided with a sound collection unit (for example, a microphone or a microphone array) and a sound recognition unit, the terminal device may display prompt words, the user may send a voice to the terminal device, the sound collection unit of the terminal device collects an audio, voice recognition is then performed by the voice recognition unit, and when a voice instruction for inputting room information is recognized, the terminal device displays options of content required to be uploaded, and after the user selects the target room again by means of a voice, the terminal device displays the target room and meanwhile acquires the house structure information associated with the target room. Certainly, the user may also send the voice of uploading the target room to the terminal device at a time, the sound collection unit of the terminal device collects an audio, voice recognition is then performed by the voice recognition unit, and when it is recognized that the target room is required to be uploaded, the terminal device displays the target room and meanwhile acquires the house structure information associated with the target room. The terminal device can also display an image of the target room, and the user can upload the house structure information of the target room by clicking the target room. The terminal device can also be a non-touch display device, and at this point, the target room can be selected by an interaction device, such as a mouse and a keyboard, such that the house structure information is uploaded.

S202: controlling a layout of articles in the target room based on the basic information of the target room to generate at least one design scheme of the target room, the design scheme including the house structure information and article placement information.

Figure 5:
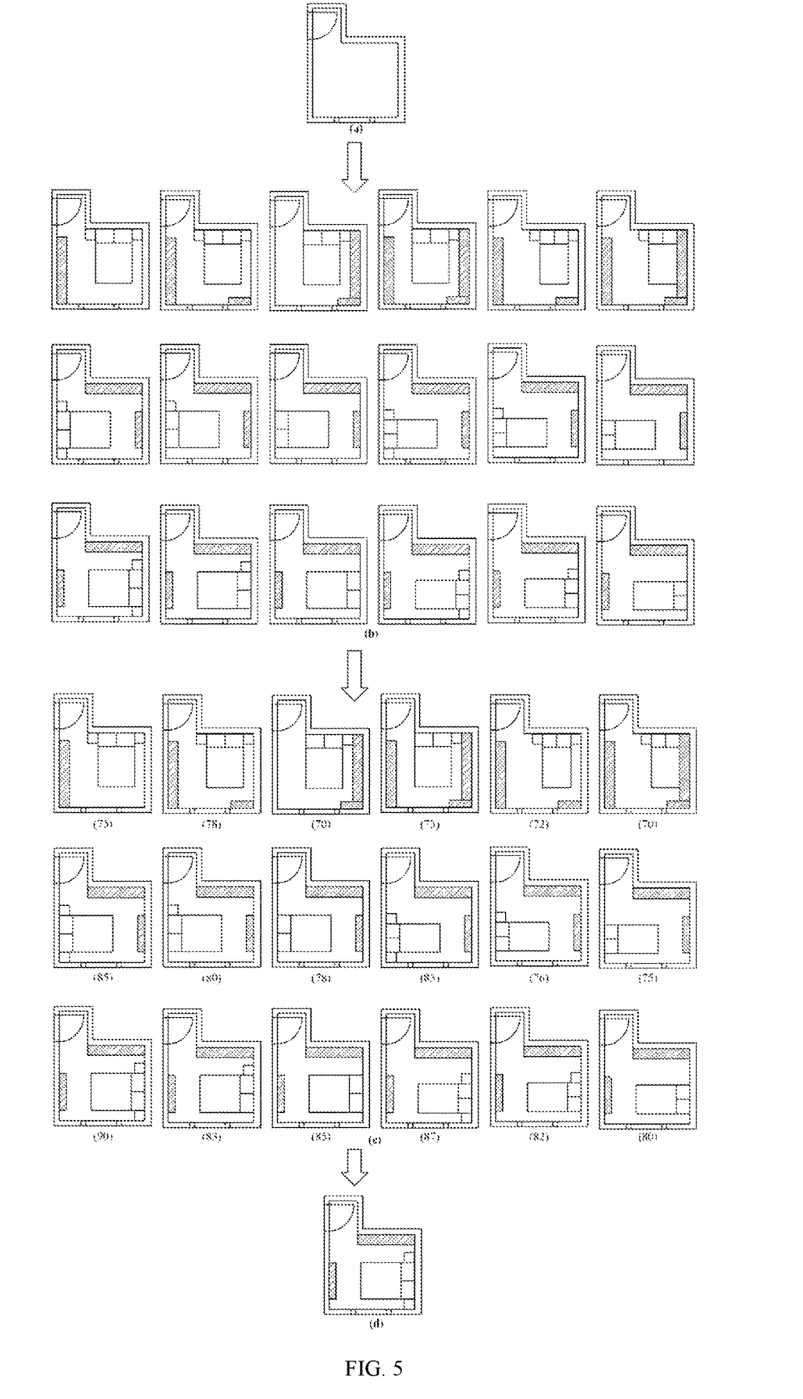
FIG. 5 is a schematic diagram of a specific embodiment of the indoor design scheme acquisition method according to the embodiment of the present disclosure.

As shown in the part (a) of FIG. 5, the house structure information of the target room includes civil engineering elements, such as walls, doors, windows, roofs and floors, as well as sizes and positions of the civil engineering elements, such as the areas of the floors, the positions, thicknesses, lengths and heights of the walls, the positions, lengths and heights of the windows, and the positions, mounting directions, lengths and heights of the doors in the target room. After the articles in the target room are determined, an initial state of each article is a current state thereof, the position of each article relative to each civil engineering element is adjusted on the basis of the civil engineering element in the house structure information by taking the initial state as the basis, adjustment directions at least include forward, backward, leftward, rightward and other directions, the placement information of the article can be generated, the placement information of all the articles in the room is summarized, and one design scheme can be obtained. It can be understood that each time the position of the article is adjusted, the placement information of the article after the adjustment can be obtained; as a number of adjustments increases, a number of the obtained design schemes also increases. In the present embodiment, in the process of laying out the articles, all possible placing manners of the articles in a house structure are acquired, so as to obtain all possible design schemes (as shown in the part (b) of FIG. 5).

S203: acquiring scores of the design schemes based on the house structure information and the article placement information.

During movement of each article in the target room, a layout state of the target room changes with a change of the position of each article, and corresponding scores are different, such that the score of the corresponding design scheme changes (as shown in the part (c) of FIG. 5), and the score can reflect an ideal situation of the position of each article in the target room, so as to confirm whether the corresponding overall design scheme meets a preset requirement.

S204: determining the design scheme meeting the preset requirement as a target design scheme based on the scores of the design schemes.

For each obtained design scheme, the corresponding score is obtained, and when the score meets the preset requirement, each article in the target room is located at a target position, and at this point, an overall layout of the target room is the design scheme presented to the user (as shown in the part (d) of FIG. 5); when the score does not meet the preset requirement, at least one of the articles in the target room is not located at the target position, and at this point, the overall layout of the target room is not required to be presented to the user. It may be understood that a number of the target design schemes may be one or more, and is not limited herein. After determined, the target design scheme is displayed to the user by the terminal device, such that the user can view an indoor design effect in time.

With the technical solution according to the embodiment of the present disclosure, when the indoor articles are laid out, all the articles in the target room are controlled to move based on the house structure information of the target room, all the layout schemes of the indoor articles can be obtained, design requirements of different scenarios and different house structures can be met, and missing of the design schemes is avoided. In the present embodiment, the design scheme meeting the preset requirement is determined from all the technical schemes by scoring all the acquired design schemes, so as to guarantee correctness of the obtained target design scheme, avoid the situation that indoor design is incorrect, ensure that requirements of the decoration specification are met, effectively improve the accuracy of the design scheme, and quickly and conveniently obtain the indoor design scheme satisfied by the user. In the present embodiment, during the interaction with the user, the user is only required to input the basic information of the target room, the optimal design scheme can be automatically obtained in the whole process without any operation of the user, the interaction is simpler, and user experiences are improved.

After the user-selected house structure information of the target room is input, the articles of the target room can be selected in different ways.

In one way, a type of the article in the target room may be automatically determined based on the house structure information of the target room. For example, when the target room is a kid room, the indoor articles can be automatically determined as a bed, a desk and a wardrobe, and a bedside table and a television bench are not required to be placed; when the target room is a master bedroom, the indoor articles can be automatically determined as a bed, a bedside table, a wardrobe and a television bench. After the type of the article is determined, a number and a size of the article can be automatically determined. For example, in the kid room, the bed has a width of 90 cm or 120 cm, the wardrobe has a width of 120 cm or 135 cm, and the desk has a width of 80 cm or 100 cm; in the master bedroom, the bed has a width of 150 cm or 180 cm, a number of the bedside tables is two, the bedside table has a width of 30 cm or 40 cm, the wardrobe has a width of 150 cm or 180 cm, and the television bench has a width of 120 cm or 150 cm. In this way, the user is only required to input the house structure information in the whole process, and does not need to perform any other operation.

In another way, the type, number and size of the article in the target room may be specified by the user. After the user inputs the house structure information of the target room, candidate articles can be displayed by the terminal device, the user can select the indoor articles required to be laid out for the target room, and the selection of the candidate articles is provided for the user according to an article selection rule. For example, for the master bedroom, the user may select whether to provide the bedside table, the number of the bedside tables, whether to provide the television bench, or the like, and meanwhile select the size. Certainly, the selection process is also limited by the article selection rule; for example, the number of the bedside tables is at most two, and the width of the bed cannot be larger than the width of the wall. When the user selects the article and determines attribute information of the article, the design scheme is generated.

A specific process of generating the design scheme of the target room in step S202 may be set as required.

Figure 3:
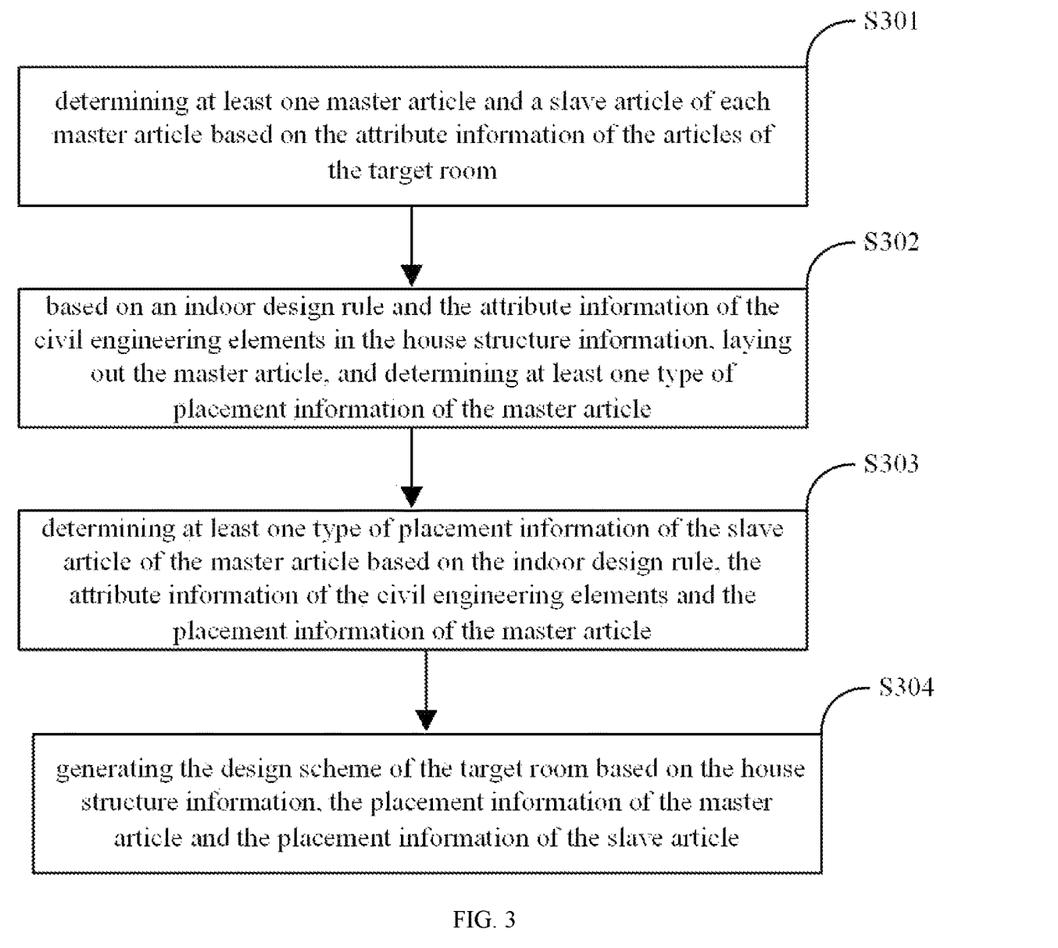
FIG. 3 is a flowchart of generating a design scheme of a target room in the indoor design scheme acquisition method according to the embodiment of the present disclosure.

In some embodiments, the design scheme of the target room may be generated by constructing a cellular automaton model. Referring to FIG. 3, generating the scheme of the target room by using the cellular automaton model specifically includes the following steps:

S301: determining at least one master article and a slave article of each master article based on the attribute information of the articles of the target room.

After the house structure information is acquired, civil engineering elements in the house structure information can be identified using a convolutional neural network, and size and position information of the civil engineering elements is obtained. Meanwhile, based on the house structure information, the articles in the target room required to be laid out can be determined, the attribute information, such as article types, article numbers and article sizes, can be determined, the master articles and the slave articles are determined based on the attribute information, the slave articles change with changes of positions of the master articles, and strong correlation is achieved. For example, for a layout of a bedroom, the bed is a quite important design element, the bedside table is synchronously adjusted with an adjustment of the position of the bed, and at this point, the bed is the master article, and the bedside table is the slave article;

preferably, the number of the bedside tables is two, and the two bedside tables are provided on two sides of a bed head respectively. Usually, the television bench is provided opposite to a bed tail, such that the user can conveniently watch television at rest, and therefore, the television bench is also the slave article of the bed. Placement of the wardrobe in the bedroom has no fixed relationship with the bed, and therefore, the wardrobe is not the slave article of the bed and can be set as another master article. It can be understood that there may be only one or more kinds of master articles in the target room; there may be only one or more kinds of slave articles for each master article, which is not limited herein.

S302: based on an indoor design rule and the attribute information of the civil engineering elements in the house structure information, laying out the master article, and determining at least one type of placement information of the master article.

During the indoor design, the indoor design rule can be determined based on a house size, an article size, an ergonomic size and an indoor walking route. The ergonomic size refers to the size required by a person using the article; for example, a use region in front of the wardrobe is reserved, a use region in front of the bedside table is reserved, and a use distance between the sofa and a table is reserved; the indoor walking route refers to a reserved walking position between functional articles; for example, a passageway for walking of a person is required to be guaranteed between an indoor door and a balcony of the bedroom, the bed cannot be placed in front of the door, the wardrobe cannot be placed in front of the door, the bedside table cannot be placed in front of the door, and a passageway for walking of a person is reserved between the television bench and the bed. The positions of the indoor articles relative to the civil engineering elements are also required to be determined; for example, the indoor window cannot be blocked during article placement, the bed head is required to be placed close to the wall, a width of the wall on the side where the bed head is located is required to be larger than a width of the bed head, and the wardrobe is required to be provided close to the wall.

Based on the determined indoor design rule, the master articles are placed in combination with the attribute information in the house structure information, such as the size and position of each civil engineering element, the master articles are randomly placed initially, but attention is required to be paid to the relative position relationship between the master articles and each civil engineering element. For example, when the bed is placed, the bed head is required to be provided close to the wall, the width of the wall close to the bed head is required to be larger than the width of the bed head, the bed cannot block the indoor door, and the bed head cannot be provided close to the window. Based on the above relative position relationship and requirements of the indoor design rule, the position of the master article is moved according to a preset step length (the step length can be set as required, and can be, for example, 5 cm, 10 cm, 15 cm, 20 cm, or the like). Each time the position is moved, the placement information (i.e., position information) of the master article at the position is correspondingly obtained. Since the house structure of the target room is determined, a number of the positions where the master article can be placed in the target room is determined, and therefore, all the placement positions of the master article can be obtained exhaustively. When a plurality of master articles exist, the plural master articles can be placed at the same time or sequentially as long as all the placement positions can be obtained.

S303: determining at least one type of placement information of the slave article of the master article based on the indoor design rule, the attribute information of the civil engineering elements and the placement information of the master article.

For each placement position of the master article, after the position of the master article is determined, the slave article can be placed based on the relative position relationship of the master article and the slave article, so as to obtain the position of the slave article. The relative position relationship between the master article and the slave article may be a determined relative position; for example, the bedside tables are placed on both sides of the bed head, and when the position of the bed is determined, the positions of the bedside tables are also determined at the same time. The relative position relationship between the master article and the slave article may also be an incompletely determined relative position; for example, the television bench is provided opposite to the bed tail, but the specific position (for example, right facing, diagonal facing, a relative distance) of the television bench relative to the bed tail can be adjusted, such that the corresponding slave article may have a plurality of placement positions, and the placement information is correspondingly diversified. When the slave article is placed, all the placement positions are obtained exhaustively.

S304: generating the design scheme of the target room based on the house structure information, the placement information of the master article and the placement information of the slave article. After the master article and the slave article are placed in this way, the corresponding design scheme can be obtained by synthesizing the placement information of the master article and the placement information of the slave article obtained each time in combination with the house structure information. Since all the placement information of the master and slave articles is obtained exhaustively, all the design schemes can be obtained (as shown in the part (b) of FIG. 5).

In the present embodiment, the master article is preferentially laid out based on the indoor design rule, and then, the slave article is laid out based on the association relationship between the slave article and the master article, and all layout modes are obtained exhaustively, such that invalid schemes can be eliminated to reduce a calculation amount for generating the design scheme, and accuracy of the generated design scheme is guaranteed.

In some other embodiments, after the house structure information of the target room is obtained, since the basic information (such as the size and position) of the civil engineering elements therein is determined in the house structure information, the attribute information, such as the type, size and number, of the article in the target room can be automatically determined based on the obtained basic information of the civil engineering elements. For example, the target room is a bedroom, the positions of the wall, the door, the window, or the like, in the bedroom are determined, and at this point, the articles in the room can be determined to include the bed, the bedside table, the wardrobe, the television bench, or the like, according to the house structure information of the bedroom, and 1 bed, 2 bedside tables, 1 wardrobe, 1 television bench, or the like, are determined. Then, each article is controlled to be randomly placed in the target room based on the attribute information of the article, the position of each article is recorded, the placement information of the article can be obtained in combination with the determined attribute information of the article, and the design scheme of the target room can be obtained by synthesizing the placement information of all the articles. The position of each article is continuously updated, and the corresponding design scheme is recorded for each update, such that all the design schemes in the target room can be obtained. It can be understood that, since the positions of the articles are set by means of random placement without considering a connection relationship between the articles, the number of the generated design schemes is relatively large, which requires that the terminal device has stronger computing power or requires a longer computing time.

Further, a specific process of acquiring the score of the design scheme in step S203 may be set as required.

In some embodiments, the design scheme may be scored based on a decision tree structure to obtain the corresponding score. Firstly, a design scheme scoring model based on a decision tree is constructed based on the basic information of the target room. Specifically, the target room serves as a root node, father node information is determined based on the articles in the target room, and the father node information includes a father node type and a weight of each father node; then, child node information of each father node is determined and includes a child node type and a weight of each child node; based on the root node, the father node information and the child node information, the design scheme scoring model may be obtained. Taking the bedroom as an example, the articles in the bedroom include the bed, the bedside table, the television bench, the wardrobe, or the like, a decision tree structure is required to be determined according to the articles, the root node is the bedroom, the father node in a first layer thereof are the master articles in the bedroom and include the bed, the wardrobe, or the like, and the corresponding weight is distributed to each father node; a position of a first child node of the bed in the target room is determined with the bed as the father node, each position corresponds to a different first child node, and each first child node corresponds to a different weight; for each first child node, the first child node serves as the father node, the child node thereof is determined and recorded as a second child node, and the second child node is the bedside table, the television bench, or the like; then, a third child node is determined as the position of the bedside table within the target room. By analogy, the types and weights of the child nodes are continuously determined according to the father nodes. In the finally obtained decision tree structure, a path from each leaf node to the root node covers all the articles in the target room, one position of each article and the weight of each article, such that the score corresponding to one design scheme can be determined. The weight of each father node or child node is preset according to design requirements; for example, for the bed, the closer the position of the bed in the room is to a middle position, the higher the weight is, and the closer the position is to an edge, the lower the score is; for the wardrobe, the closer the position thereof in the room is to the wall and the edge, the higher the weight is, and the closer the position is to the middle position, the lower the weight is. Certainly, the weight may be set according to other manners, and the weight may also be replaced by a score, which is not limited herein. Next, after the design scheme scoring model is constructed, each design scheme is processed using the model; that is, each design scheme is classified using the decision tree structure, and finally, the score of the design scheme is obtained (as shown in the part (c) of FIG. 5).

In some embodiments, the design scheme may be scored based on a neural network model to obtain the corresponding score. Firstly, the neural network model is trained using marked big data, the marked big data includes a large number of design schemes, design features (including structural features, article features, and an association relationship between the structural features and the article features) of each design scheme are marked, and each design scheme is associated with one score. In the process of training the neural network model, the design features and the scores of the design scheme can be analyzed and correlated, and an automatic scoring capability is obtained by means of machine learning. When the neural network model after learning is complete is configured to score the design scheme, firstly, the house structure information and the house placement information of the design scheme are identified to obtain the structural features and the article features of the design scheme; then, based on the structural features and the article features, the association relationship therebetween is further acquired to determine the design features of the design scheme; finally, based on the design features, the score of the design scheme is determined.

After the scores of all the design schemes are obtained, the target design scheme is required to be determined. The target design scheme is determined based on the preset requirement, and the determined target design scheme may vary with the preset requirement. For example, when the preset requirement indicates that the score of the design scheme is required to be higher than a certain score threshold (the score threshold may be set as required, for example, for a centesimal system, the score threshold may be 80, 85, 90, 95, 98, or the like), the scores of all the design schemes are compared with the score threshold, the design scheme with the score higher than the score threshold may be determined as the target design scheme, and in this way, the number of the target design schemes may be 1 or more. For another example, when the preset requirement indicates that the design scheme with the highest score is selected, all the design schemes are sorted according to the scores, and the design scheme with the highest score is determined as the target design scheme (as shown in the part (d) of FIG. 5), and at this point, the number of the target design schemes may be 1 or more (the scores of plural design schemes are the same). For another example, when a plurality of design schemes are required to be displayed to the user, and the preset requirement indicates that a preset number of design schemes with top scores are selected, all the design schemes are sorted according to the scores, and the preset number of design schemes with top scores are determined as the target design schemes.

After determined, the selected target design scheme is displayed to the user by the display screen of the terminal device.

Figure 4:
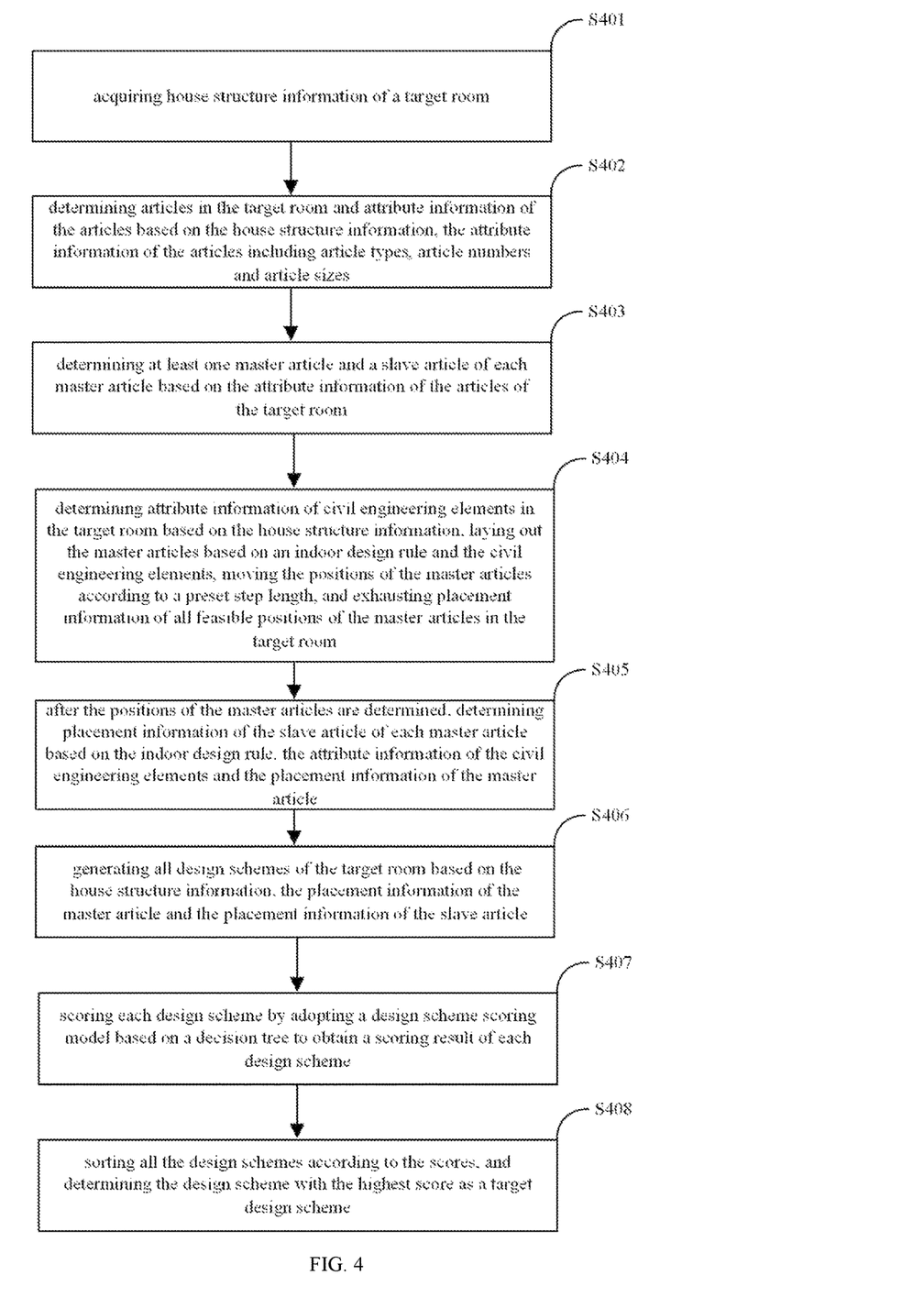
FIG. 4 is a flowchart of a specific embodiment of the indoor design scheme acquisition method according to the embodiment of the present disclosure.

FIG. 4 is a flowchart of a specific embodiment of the indoor design scheme acquisition method according to the present embodiment. The description is given by taking as an example the indoor design of the bedroom of a common house, in which the article is furniture. Referring to FIG. 5, the indoor design scheme acquisition method includes the following steps:

S401: acquiring house structure information of a target room.

S402: determining articles in the target room and attribute information of the articles based on the house structure information, the attribute information of the articles including article types, article numbers and article sizes. The articles include a bed, a bedside table, a television bench and a wardrobe.

S403: determining at least one master article and a slave article of each master article based on the attribute information of the articles of the target room. The bed and the wardrobe are determined as the master articles, the slave articles of the bed include the bedside table and the television bench, and the wardrobe has no slave articles.

S404: determining attribute information of civil engineering elements (the civil engineering elements include doors, windows and walls, and the attribute information thereof includes categories, sizes and positions) in the target room based on the house structure information, laying out the master articles based on an indoor design rule and the civil engineering elements, moving the positions of the master articles according to a preset step length, and exhausting placement information of all feasible positions of the master articles in the target room. During placement, the bed and the wardrobe can be moved simultaneously, or the positions of the other master article can be exhausted with one master article fixed, until the placement information of all the placement positions of the master articles is obtained.

S405: after the positions of the master articles are determined, determining placement information of the slave article of each master article based on the indoor design rule, the attribute information of the civil engineering elements and the placement information of the master article. During specific operations, based on the same idea as acquisition of the placement information of the master article, the placement information of all the placement positions of the slave articles is exhausted.

S406: generating all design schemes of the target room based on the house structure information, the placement information of the master article and the placement information of the slave article.

S407: scoring each design scheme by adopting a design scheme scoring model based on a decision tree to obtain a scoring result of each design scheme.

S408: sorting all the design schemes according to the scores, determining the design scheme with the highest score as a target design scheme, and displaying the target design scheme by a display screen of the terminal device.

All the above optional technical solutions may be combined arbitrarily to form optional embodiments of the present application, and are not repeated herein.

An apparatus according to the embodiments of the present disclosure is described below, and may be configured to perform the method according to the embodiments of the present disclosure. For details not disclosed in the embodiments of the apparatus according to the present disclosure, reference is made to the embodiments of the method according to the present disclosure.

Figure 6:
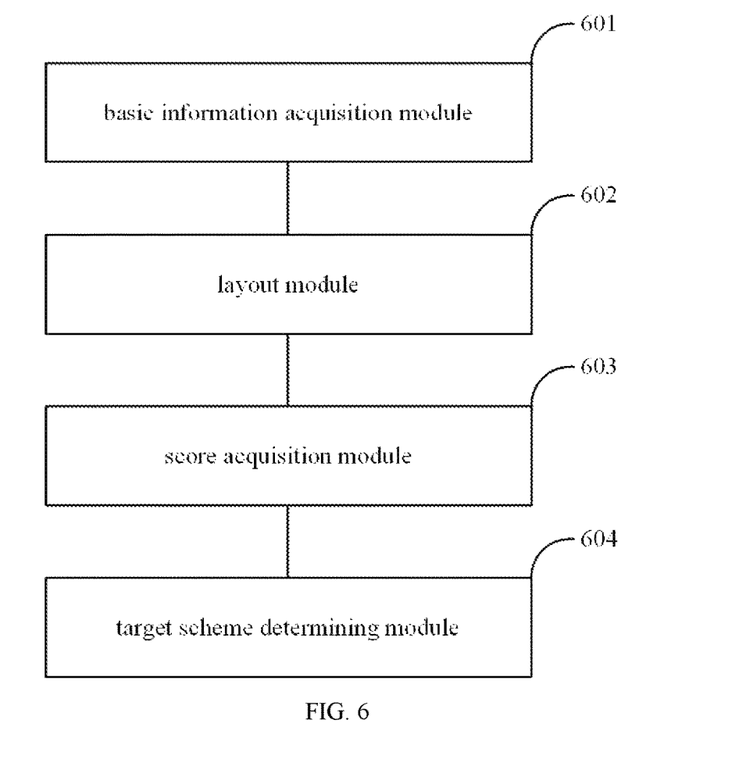
FIG. 6 is a block diagram of an indoor design scheme acquisition apparatus according to the embodiment of the present disclosure.

FIG. 6 is a schematic diagram of an indoor design scheme acquisition apparatus according to the embodiment of the present disclosure. As shown in FIG. 6, the indoor design scheme acquisition apparatus includes:

a basic information acquisition module 601 configured to acquire basic information of a target room, the basic information at least including house structure information;

a layout module 602 configured to control a layout of articles in the target room based on the basic information of the target room to generate at least one design scheme of the target room, the design scheme including the house structure information and article placement information;

a score acquisition module 603 configured to acquire scores of the design schemes based on the house structure information and the article placement information; and a target scheme determining module 604 configured to determine the design scheme meeting a preset requirement as a target design scheme based on the scores of the design schemes.

With the technical solution according to the embodiment of the present disclosure, when the indoor articles are laid out, all the articles in the target room are controlled to move based on the house structure information of the target room, all the layout schemes of the indoor articles can be obtained, design requirements of different scenarios and different house structures can be met, and missing of the design schemes is avoided. In the present embodiment, the design scheme meeting the preset requirement is determined from all the technical schemes by scoring all the acquired design schemes, so as to guarantee correctness of the obtained target design scheme, avoid the situation that indoor design is incorrect, ensure that requirements of the decoration specification are met, effectively improve the accuracy of the design scheme, and quickly and conveniently obtain the indoor design scheme satisfied by the user. In the present embodiment, during the interaction with the user, the user is only required to input the basic information of the target room, the optimal design scheme can be automatically obtained in the whole process without any operation of the user, the interaction is simpler, and user experiences are improved.

In some embodiments, the layout module 602 is configured to: determine at least one master article and a slave article of each master article based on attribute information of the articles of the target room; based on an indoor design rule and attribute information of civil engineering elements in the house structure information, lay out the master article, and determine at least one type of placement information of the master article; determine at least one type of placement information of the slave article of the master article based on the indoor design rule, the attribute information of the civil engineering elements and the placement information of the master article; and generate a design scheme of the target room based on the house structure information, the placement information of the master article and the placement information of the slave article.

It should be understood that, the sequence numbers of the steps in the foregoing embodiments do not imply an execution sequence, and the execution sequence of each process should be determined by functions and internal logic of the process, and should not constitute any limitation to the implementation process of the embodiments of the present disclosure.

Figure 7:
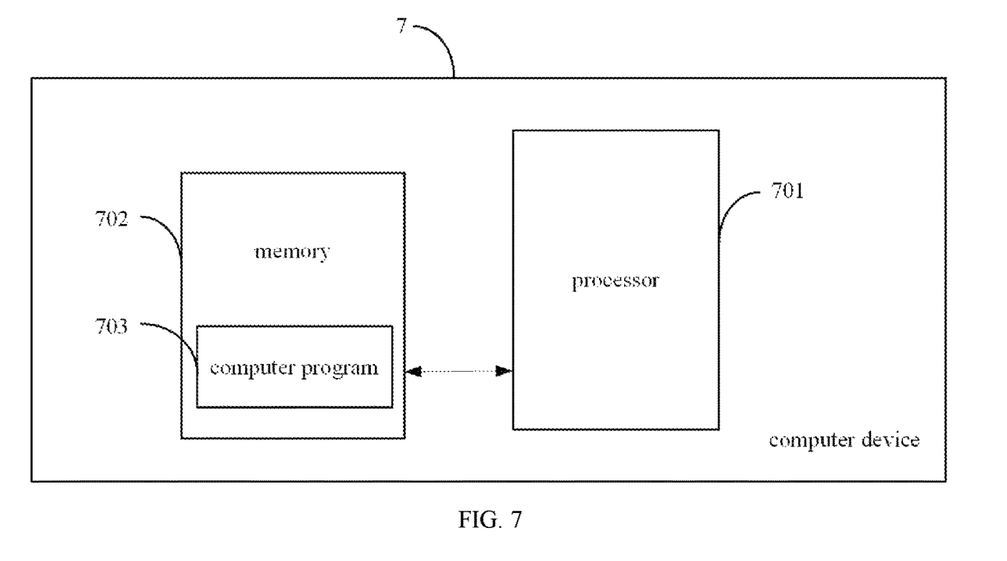
FIG. 7 is a schematic diagram of a computer device according to the embodiment of the present disclosure.

FIG. 7 is a schematic diagram of a computer device 7 according to the embodiment of the present disclosure. As shown in FIG. 7, the computer device 7 according to the present embodiment includes: a processor 701, a memory 702, and a computer program 703 stored in the memory 702 and executable on the processor 701. The steps in the various method embodiments described above are implemented when the processor 701 executes the computer program 703. Alternatively, the processor 701 achieves the functions of each module/unit in each apparatus embodiment described above when executing the computer program 703.

Exemplarily, the computer program 703 may be partitioned into one or more modules/units, which are stored in the memory 702 and executed by the processor 701 to complete the present disclosure. One or more of the modules/units may be a series of computer program instruction segments capable of performing specific functions, the instruction segments describing the execution of the computer program 703 in the computer device 7.

The computer device 7 may be a desktop computer, a notebook, a palm computer, a cloud server or another computer device. The computer device 7 may include, but is not limited to, the processor 701 and the memory 702. Those skilled in the art may understand that a structure shown in FIG. 7 is only an example of the computer device 7 and does not limit the computer device 7, which may include more or fewer components than those shown in the drawings, or some components may be combined, or a different component deployment may be used. For example, the computer device may further include an input/output device, a network access device, a bus, or the like.

The processor 701 may be a Central Processing Unit (CPU), or other general-purpose processors, Digital Signal Processors (DSP), Application Specific Integrated Circuits (ASIC), Field-Programmable Gate Arrays (FPGA) or other programmable logic devices, discrete gates or transistor logic devices, discrete hardware components, etc. The general-purpose processor may be a microprocessor or the processor may be any general processor, or the like.

The memory 702 may be an internal storage unit of the computer device 7, for example, a hard disk or memory of the computer device 7. The memory 702 may also be an external storage device of the computer device 7, such as a plug-in hard disk, a Smart Media Card (SMC), a Secure Digital (SD) Card, a Flash Card, or the like, configured on the computer device 7. Further, the memory 702 may also include both the internal storage unit and the external storage device of the computer device 7. The memory 702 is configured to store the computer program and other programs and data required by the computer device. The memory 702 may be further configured to temporarily store data which has been or will be outputted.

It may be clearly understood by those skilled in the art that, for convenient and brief description, division of the above functional units and modules is used as an example for illustration. In practical application, the above functions can be allocated to different functional units and modules and implemented as required; that is, an internal structure of the apparatus is divided into different functional units or modules to accomplish all or some of the functions described above. The functional units or modules in the embodiments may be integrated into one processing unit, or each of the units may exist alone physically, or two or more units are integrated into one unit, and the integrated unit may be implemented in a form of hardware, or may also be implemented in a form of a software functional unit. In addition, specific names of all the functional units or modules are merely for facilitating the differentiation, but are not intended to limit the protection scope of this application. For a specific working process of the units or modules in the above system, reference may be made to the corresponding process in the foregoing method embodiments, which is not repeated herein.

In the above embodiments, the description of each embodiment has its own emphasis. For a part not described in detail in one embodiment, reference may be made to relevant description of other embodiments.

Those of ordinary skill in the art would appreciate that the units and algorithmic steps of the examples described in combination with the embodiments disclosed herein can be implemented by electronic hardware or a combination of computer software and electronic hardware. Whether these functions are performed by hardware or software depends on a specific application and design constraints of the technical solution. Technical professionals may achieve the described functions in different methods for each particular application, but such implementation should not be considered beyond the scope of the present disclosure.

In the embodiments according to the present disclosure, it is to be understood that the disclosed apparatus/computer device and method can be implemented in other ways. For example, the embodiment of the apparatus/computer device described above is merely schematic. For example, the division of the modules or units is merely logical function division, and there may be other division manners in an actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between apparatuses or units may be implemented in an electric form, a mechanical form, or other forms.

The units described as separate parts may or may not be physically separate, and parts displayed as units may or may not be physical units, may be located at one position, or may be distributed on a plurality of network units. Some or all of the units may be selected according to actual needs to achieve the objectives of the solutions of the embodiments.

In addition, the functional units in the embodiments of the present disclosure may be integrated into one processing unit, or each of the units may exist alone physically, or two or more units are integrated into one unit. The integrated unit may be implemented in a form of hardware or in a form of a software functional unit.

The integrated module/unit may be stored in a computer-readable storage medium when implemented in the form of the software functional unit and sold or used as a separate product. Based on such understanding, all or some of the processes in the method according to the above embodiments may be realized in the present disclosure, or completed by the computer program instructing related hardware, the computer program may be stored in the computer-readable storage medium, and when the computer program is executed by the processor, the steps of the above method embodiments may be realized. The computer program may include a computer program code, which may be in a form of a source code, an object code or an executable file or in some intermediate forms. The computer-readable medium may include any entity or apparatus capable of carrying the computer program code, a recording medium, a USB flash drive, a removable hard disk, a magnetic disk, an optical disk, a computer memory, a Read-Only Memory (ROM), a Random Access Memory (RAM), an electrical carrier signal, a telecommunication signal, a software distribution medium, and so on. It should be noted that content included in the computer-readable medium may be appropriately increased or decreased according to requirements of legislation and patent practice in a jurisdiction, for example, in some jurisdictions, according to legislation and patent practice, the computer-readable medium does not include the electrical carrier signal and the telecommunication signal.

The above embodiments are merely intended to describe the technical solutions of the present disclosure, but not to limit the present disclosure. Although the present disclosure is described in detail with reference to the foregoing embodiments, those of ordinary skill in the art should understand that they may still make modifications to the technical solutions described in the foregoing embodiments or make equivalent replacements to some technical features thereof. Such modifications or replacements do not cause the essence of the corresponding technical solutions to depart from the spirit and scope of the technical solutions of the embodiments of the present disclosure, and should be included in the protection scope of the present disclosure.

What is claimed is:

1. An indoor design scheme acquisition method, comprising:
    acquiring basic information of a target room, the basic information at least comprising house structure information;
    controlling a layout of articles in the target room based on the basic information of the target room to generate at least one design scheme of the target room, the design scheme comprising the house structure information and article placement information;
    acquiring scores of the design schemes based on the house structure information and the article placement information; and
    determining the design scheme meeting a preset requirement as a target design scheme based on the scores of the design schemes;
    wherein the acquiring scores of the design schemes based on the house structure information and the article placement information comprises:
    with the target room as a root node, determining father node information of the root node based on the articles of the target room, the father node information comprising a father node type and a weight of each father node;
    determining child node information of each father node according to the father node information, the child node information comprising a child node type and a weight of each child node;
    acquiring a design scheme scoring model based on the root node, the father node information and the child node information; and
    processing each design scheme based on the design scheme scoring model to obtain the score of the design scheme.

2. The method according to claim 1, wherein the controlling a layout of articles in the target room based on the basic information of the target room to generate at least one design scheme of the target room comprises:
    determining at least one master article and a slave article of each master article based on attribute information of the articles of the target room;
    based on an indoor design rule and attribute information of civil engineering elements in the house structure information, laying out the master article, and determining at least one type of placement information of the master article;
    determining at least one type of placement information of the slave article of the master article based on the indoor design rule, the attribute information of the civil engineering elements and the placement information of the master article; and
    generating the design scheme of the target room based on the house structure information, the placement information of the master article and the placement information of the slave article.

3. The method according to claim 2, before the step of determining at least one master article and a slave article of each master article based on attribute information of the articles of the target room, further comprising:
    determining the attribute information of the articles of the target room based on the house structure information of the target room, the attribute information of the articles comprising article types, numbers of the articles and sizes of the articles.

4. The method according to claim 2, before the step of determining at least one master article and a slave article of each master article based on attribute information of the articles of the target room, further comprising:
    providing candidate articles of the target room for a user based on the house structure information of the target room; and
    acquiring an article selected by the user from the candidate articles, and determining the attribute information of the selected article.

5. The method according to claim 1, wherein the controlling a layout of articles in the target room based on the basic information of the target room to generate at least one design scheme of the target room comprises:
    determining the attribute information of the articles of the target room based on the house structure information of the target room, the attribute information of the articles comprising article types, numbers of the articles and sizes of the articles; and
    controlling the articles to be randomly placed in the target room based on the attribute information of the articles in the target room, and generating a design scheme of the target room, each piece of article placement information comprising an article type, an article size and an article position.

6. The method according to claim 1, wherein the acquiring scores of the design schemes based on the house structure information and the article placement information comprises:
    identifying the house structure information and the article placement information to obtain structural features and article features of the design scheme;
    determining design features of the design scheme based on the structural features and the article features, the design features comprising house features, article features and an association relationship between the house features and the article features; and
    determining the score of the design scheme based on the design features of the design scheme.

7. The method according to claim 1, wherein the determining the design scheme meeting a preset scoring requirement as a target design scheme based on the scores of the design schemes comprises:
    judging whether the score of the design scheme is larger than a score threshold; and
    if the score of the design scheme is larger than the scoring threshold, determining the design scheme as the target design scheme.

8. The method according to claim 1, wherein the determining the design scheme meeting a preset scoring requirement as a target design scheme based on the scores of the design schemes comprises:
    based on the obtained scores of the design schemes, sorting the design schemes according to the scores;
    determining the design scheme with the highest score as the target design scheme;
    or determining a preset number of design schemes as the target design schemes according to the sorting sequence of the design schemes.

9. A computer device, comprising a memory, a processor and a computer program stored in the memory and runnable on the processor, wherein the processor, when executing the computer program, implements the steps of the method according to claim 1.

10. An indoor design scheme acquisition apparatus, comprising:
- a basic information acquisition module configured to acquire basic information of a target room, the basic information at least comprising house structure information;
- a layout module configured to control a layout of articles in the target room based on the basic information of the target room to generate at least one design scheme of the target room, the design scheme comprising the house structure information and article placement information;
- a score acquisition module configured to acquire scores of the design schemes based on the house structure information and the article placement information; and
- a target scheme determining module configured to determine the design scheme meeting a preset requirement as a target design scheme based on the scores of the design schemes;

wherein the score acquisition module is specifically configured to:

with the target room as a root node, determine father node information of the root node based on the articles of the target room, the father node information comprising a father node type and a weight of each father node;

determine child node information of each father node according to the father node information, the child node information comprising a child node type and a weight of each child node;

acquire a design scheme scoring model based on the root node, the father node information and the child node information; and process each design scheme based on the design scheme scoring model to obtain the score of the design scheme.

* * * * *